United States Patent
Maes et al.

(10) Patent No.: US 9,882,824 B2
(45) Date of Patent: Jan. 30, 2018

(54) CLOUD APPLICATION DEPLOYMENT PORTABILITY

(75) Inventors: Stephane H. Maes, Fremont Alameda, CA (US); Rajeev Bharadhwaj, Saratoga, CA (US); Travis S. Tripp, Fort Collins, CO (US); Ritesh Sunder Shetty, Foster City, CA (US); John M. Green, Rocklin, CA (US)

(73) Assignee: HEWLETT PACKARD ENTERPISE DEVELOPMENT LP, Houston, TX (US)

( * ) Notice: Subject to any disclaimer, the term of this patent is extended or adjusted under 35 U.S.C. 154(b) by 400 days.

(21) Appl. No.: 14/394,597

(22) PCT Filed: Jun. 8, 2012

(86) PCT No.: PCT/US2012/041607
§ 371 (c)(1),
(2), (4) Date: Oct. 15, 2014

(87) PCT Pub. No.: WO2013/184133
PCT Pub. Date: Dec. 12, 2013

(65) Prior Publication Data
US 2015/0074278 A1    Mar. 12, 2015

(51) Int. Cl.
*G06F 15/173* (2006.01)
*H04L 12/911* (2013.01)
*G06F 9/50* (2006.01)
*H04L 29/08* (2006.01)

(52) U.S. Cl.
CPC ............ *H04L 47/70* (2013.01); *G06F 9/5072* (2013.01); *H04L 67/10* (2013.01)

(58) Field of Classification Search
CPC ........ H04L 47/70; H04L 67/10; G06F 9/5072
USPC .......................................... 709/223–226, 230
See application file for complete search history.

(56) References Cited

U.S. PATENT DOCUMENTS

| 8,539,359 | B2* | 9/2013 | Rapaport | G06Q 10/10 709/217 |
| 8,806,014 | B2* | 8/2014 | Carter | G06F 9/5072 705/400 |
| 9,075,788 | B1* | 7/2015 | Roth | G06F 11/3006 |
| 2008/0072217 | A1* | 3/2008 | Li | G06F 8/71 717/170 |
| 2010/0125664 | A1 | 5/2010 | Hadar et al. | |
| 2010/0319004 | A1* | 12/2010 | Hudson | G06F 9/5072 719/313 |

(Continued)

OTHER PUBLICATIONS

Dell, Dell Advanced Infrastructure Manager, 2010, 2 pages, http://i.dell.com/sites/content/shared-content/services/fr/Documents/advanced-infrastructure-manager-spec-sheet_fr.pdf.

(Continued)

*Primary Examiner* — Thu Ha Nguyen
(74) *Attorney, Agent, or Firm* — Tarolli, Sundheim, Covell & Tummino L.L.P.

(57) ABSTRACT

A system (100) includes a portability manager (160) to provide portability instructions to specify a change in deployment of a given application (110) on a cloud infrastructure (130). A deployment manager (120) controls deployment or lifecycle management of the given application (110) on the cloud infrastructure (130) in response to the portability instructions and based on matching cloud infrastructure resources to application requirements for the given application (110).

16 Claims, 6 Drawing Sheets

(56) References Cited

U.S. PATENT DOCUMENTS

| | | | |
|---|---|---|---|
| 2011/0072487 A1 | 3/2011 | Hadar et al. | |
| 2011/0213885 A1 | 9/2011 | Kelkar et al. | |
| 2011/0231552 A1 | 9/2011 | Carter et al. | |
| 2011/0231899 A1* | 9/2011 | Pulier | G06F 9/45558 726/1 |
| 2011/0283270 A1* | 11/2011 | Gass | G06F 8/65 717/168 |
| 2011/0296391 A1* | 12/2011 | Gass | G06F 8/36 717/168 |
| 2012/0066670 A1 | 3/2012 | McCarthy et al. | |
| 2012/0102486 A1 | 4/2012 | Yendluri | |
| 2012/0110154 A1 | 5/2012 | Adlung et al. | |
| 2012/0117560 A1 | 5/2012 | Vorthmann et al. | |
| 2012/0151061 A1 | 6/2012 | Bartfai-Walcott et al. | |
| 2012/0154389 A1 | 6/2012 | Bohan et al. | |
| 2012/0159517 A1* | 6/2012 | Shen | G06F 8/61 719/318 |
| 2012/0185913 A1* | 7/2012 | Martinez | G06F 9/455 726/1 |
| 2012/0233625 A1* | 9/2012 | Sabin | G06F 9/5072 718/105 |
| 2013/0036217 A1* | 2/2013 | DeJana | H04L 41/12 709/224 |
| 2013/0185667 A1* | 7/2013 | Harper | G06F 11/0709 715/772 |
| 2013/0191527 A1* | 7/2013 | Ashok | H04L 67/1031 709/224 |
| 2013/0339514 A1* | 12/2013 | Crank | H04L 63/1408 709/224 |
| 2014/0040473 A1* | 2/2014 | Ho | G06F 9/5072 709/226 |
| 2014/0040656 A1* | 2/2014 | Ho | G06F 9/5077 714/3 |
| 2014/0047342 A1* | 2/2014 | Breternitz | G06F 9/5061 715/735 |
| 2014/0068053 A1* | 3/2014 | Ravi | G06F 9/5072 709/224 |
| 2014/0068258 A1* | 3/2014 | Chao | G06F 11/1469 713/167 |
| 2014/0280805 A1* | 9/2014 | Sawalha | G06F 9/5072 709/222 |
| 2015/0033221 A1* | 1/2015 | Chari | H04L 63/105 718/1 |
| 2015/0100684 A1* | 4/2015 | Maes | G06F 11/3672 709/224 |
| 2015/0134424 A1* | 5/2015 | Matzlavi | G06Q 10/0637 705/7.36 |
| 2015/0163285 A1* | 6/2015 | Chakra | G06F 9/5027 709/201 |
| 2015/0180734 A1* | 6/2015 | Maes | G06F 9/5072 709/226 |
| 2015/0180949 A1* | 6/2015 | Maes | H04L 43/10 709/201 |
| 2015/0199197 A1* | 7/2015 | Maes | G06F 8/71 717/122 |
| 2015/0244595 A1* | 8/2015 | Oberlin | H04L 41/5025 709/224 |
| 2015/0244597 A1* | 8/2015 | Maes | G06Q 10/10 715/736 |
| 2015/0296030 A1* | 10/2015 | Maes | G06F 9/5072 715/736 |
| 2015/0304175 A1* | 10/2015 | Maes | G06F 8/70 709/226 |
| 2015/0304231 A1* | 10/2015 | Gupte | G06F 9/5072 709/226 |
| 2015/0312356 A1* | 10/2015 | Roth | G06F 11/3006 709/226 |
| 2015/0370445 A1* | 12/2015 | Wang | G06F 17/30896 715/765 |
| 2015/0370594 A1* | 12/2015 | Ghosh | G06F 9/45533 718/1 |
| 2016/0062879 A1* | 3/2016 | Tan | G06F 11/3688 714/38.1 |
| 2016/0077807 A1* | 3/2016 | Newman | G06F 9/5072 717/104 |
| 2016/0094624 A1* | 3/2016 | Mordani | H04L 47/76 709/203 |
| 2016/0094647 A1* | 3/2016 | Mordani | H04L 47/70 709/226 |
| 2016/0105488 A1* | 4/2016 | Thakkar | H04L 67/10 709/217 |
| 2016/0117746 A1* | 4/2016 | Palasamudram | G06Q 10/20 705/26.5 |
| 2016/0205037 A1* | 7/2016 | Gupte | H04L 67/10 709/226 |
| 2016/0210172 A1* | 7/2016 | Ramachandra | G06F 9/5072 |
| 2016/0212020 A1* | 7/2016 | Gupte | H04L 67/10 |
| 2016/0218938 A1* | 7/2016 | Gupte | H04L 41/5025 |
| 2016/0366185 A1* | 12/2016 | Lee | H04L 63/20 |
| 2017/0126787 A1* | 5/2017 | Martinez | H04L 67/10 |
| 2017/0161039 A1* | 6/2017 | Banerjee | G06F 8/4441 |
| 2017/0161062 A1* | 6/2017 | Banerjee | G06F 8/76 |

OTHER PUBLICATIONS

Korean Intellectual Property Office, International Search Report and Written Opinion, dated Aug. 30, 2013, 10 pages, Daejeon Metropolitan City, Republic of Korea.

Whitehurst, J., Red Hat Cloud Forms: Open Clouds Under Your Control, 2012, 7 pages, http://www.hostingtecnews.com/red-hat-cloudforms-open-clouds-under-your-control.

Supplementary European Search Report, European Patent Application No. 12878517.7, dated Feb. 26, 2016, 9 pages.

* cited by examiner

CLOUD APPLICATION DEPLOYMENT PORTABILITY

CROSS-REFERENCE TO RELATED APPLICATION

This application is a national stage application under 35 U.S.C. § 371 of PCT/US2012/041607, filed Jun. 8, 2012.

BACKGROUND

Cloud computing refers to the delivery of scalable and pooled computing, storage and networking capacity as a service to a network of end-recipients. The name comes from the use of clouds as an abstraction for the complex infrastructure of networks and associated hardware operative within the cloud. Cloud computing provides services for a user's data, software and computation over a network, for example. Such computing capability relies on sharing of resources to achieve coherence and economies of scale similar to a utility (like the electricity grid) over a network (typically the Internet). Applications deployed on resources supporting the cloud presently often have to be manually deployed and that consumes considerable administrative time. The manual steps of deploying the application include the provisioning and instantiation of the infrastructure. This requires linking the installation of the application or deployment of an image to the full knowledge of the deployed infrastructure. Manual deployment typically requires numerous sequences of steps usually launched by the user who attempts to deploy the application.

DETAILED DESCRIPTION

Figure 1:
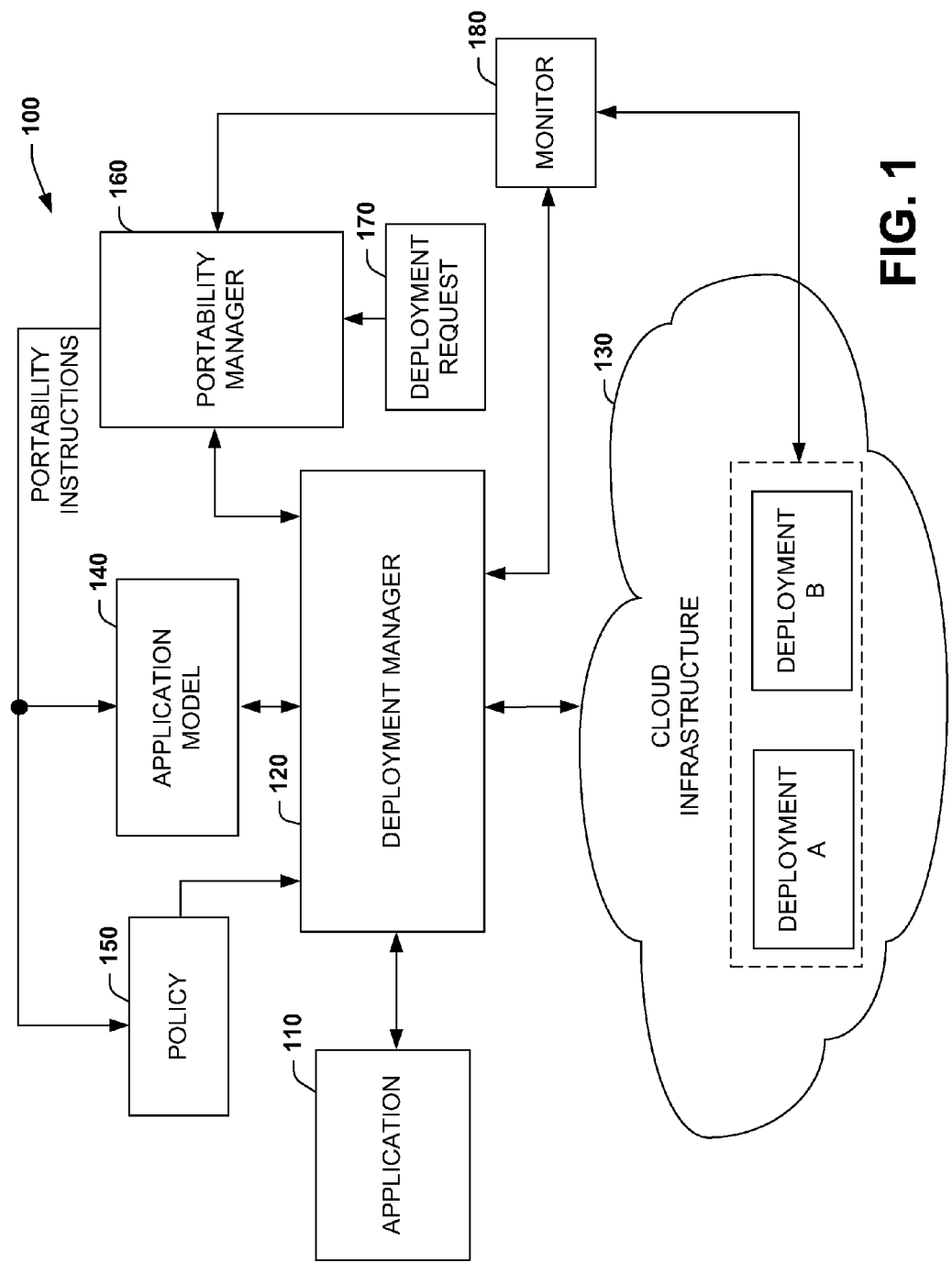
FIG. 1 illustrates an example of a system that facilitates automated deployment, application portability, and workload management for cloud applications.

FIG. 1 illustrates an example of a system 100 that facilitates automated deployment, portability, and workload management of an application in a cloud environment. The system 100 can provide automated deployment or life cycle management of an application 110 by utilizing a deployment manager 120 to determine infrastructure capabilities of a cloud infrastructure 130 (also referred to as cloud or cloud infrastructure 130). The deployment manager 120 can also determine application requirements of the application 110 by analyzing an application model 140 and policy 150. Based on such determinations, the deployment manager 120 can automatically deploy the application 110 on the cloud 130 by matching application requirements of the application to the determined capabilities and resources of the cloud. Matches between infrastructure resources and application requirements can identified via different criteria such as ideal fit or closeness. Based on a measure of closeness in the matching, for example, and/or other policy requirements, a match between infrastructure resources and application requirements can be selected and the infrastructure can be provisioned/instantiated. After such absolute or best effort matching of resources to application requirements, then the components of the application 110 can be deployed on the cloud.

The system 100 includes a portability manager 160 programmed to specify portability instructions which can update the policy 150 and/or application model 140 for deployment of the given application 110 on the cloud 130. In one example, the portability instructions update the policy 150 and/or application model 140 to specify deployments to the deployment manager 120. In another example, the portability instructions may be supplied directly (without updating the policy or application model) to the deployment manager 120 such as though commands that can be provided by an applications programming interface (API), for example.

In the example of FIG. 1, two deployments A and B are shown in the cloud 130 although a plurality of differing deployments are possible across heterogeneous cloud environments, where different service providers and resources support the cloud. The Internet is but one example of a heterogeneous cloud. Thus, based on a deployment request 170, the portability manager 160 can instruct the deployment manager 120 to move the application 110 from one deployment, such as deployment A for example to another deployment in the cloud 130, such as deployment B, for example. The portability manager 160 can be implemented as including an application programming interface (API) or graphical user interface (GUI), for example, to receive the deployment request, As shown, a monitor component 180 can monitor feedback from the deployments in the cloud 130 to provide information for such features as workload management (e.g., scaling application environment and infrastructure resources up or down) which is described below.

The deployment manager 120 can modify deployment of the given application 110 based on the policy 150 and application model 140 as modified by the portability manager 160. The application model 140 can be employed to characterize a given application 110 for deployment on the cloud infrastructure 130, such as though metadata descriptions for various components of the application.

The deployment manager 120 and portability manager 160 can be implemented via instructions stored in memory and executable by a processor to analyze an application requirement for the given application 110 based on the application model 140 and a policy 150 (or policies) associated with the given application. As will be described below, the policy 150 can be provided to describe additional operating context for the application 110 (e.g., operate application after midnight, use only east coast servers, maintain load balancing between servers, and so forth). The deployment manager 120 can then determine a set of infrastructure resources in the cloud infrastructure sufficient to fulfill the application requirement of the application 110 as specified by the model 140 and policy 150. The deployment manager 120 can also change the deployment from deployment A to deployment B based on commands issued by the portability manager 160 to the deployment manager 120.

The system 100 utilizes the capability of dynamic application models 140 (e.g., changeable upon request to alter application deployment) and policies 150 which can also include dynamic infrastructure templates and dynamic binding to provide application and workload portability across potentially heterogeneous hybrid clouds 130 or resource pools. Workload management (e.g., auto scaling, scale up or down of infrastructure resources) can also be provided. For example, based on the load, a scale out/scale in operation may be performed or a move of the application to another location based on policy criteria. The application model 140 or policy 150 can describe how to deploy (or tear down/un-deploy) an application in a portion of a cloud infrastructure utilized for deployment of a given application. For example, the application model 140 or policy 150 can identify infrastructure resources and what is needed from the cloud infrastructure 130 for deployment or retirement of the given application. The portability manager 160 can change the policy 160 and/or application model 140 for a deployment of the application 110 and based on request 170. Such change in deployments can be achieved on another cloud configuration (e.g., from A to B, or vice versa) to provide the desired information to execute the application on the different configuration even if the cloud is based on different APIs, network resources, and so forth. Example reasons for moving the application 110 across different deployments can include load balancing, moving from private to public configurations or vice versa, increasing or decreasing resources for the application, and scaling the application up or down across different infrastructure resources, for example.

Moving the application 110 from one deployment to another can include deploying the application via the deployment manager 120 to a different cloud configuration (e.g., or pool of resources), with policy 150 and/or application model 140 specifying the use of infrastructure resources in the different cloud. In such an example, the policy or application model can be adjusted via the portability manager 160 to effect such changes. As mentioned herein, such specifications and commands for moving the application 110 can be initiated via the deployment request 170, which can include a request received via an API or GUI, for example.

As a further example, the application 110 and its corresponding current deployment can be identified by a Real Time Service Model (RTSM), such as can be stored in a repository or database (not shown). The portability manager 160 can call the RTSM to identify the infrastructure resources for the corresponding current deployment and un-deploy/retire the application and infrastructure after the new deployment has been achieved. Such retirement of the old deployment can also be initiated by an API or GUI request, for example.

In addition to moving the application from one deployment to another, the portability manager 160 and deployment manager 120 can cooperate to manage other related aspects of deployment, including workload management, for example. Workload management can include scaling up or scaling down/workload management of the associated infrastructure resources for deployment of the given application. Workload management can also result from requests to adjust workload for a given deployment (e.g., via GUI or API request). In addition to workload management, deployment (e.g., moving, copying, retiring, of application components) can be utilized for lifecycle management of the given application. For example, a component or system separate from the deployment manager 120 or portability manager 160 can schedule lifecycle operations where current application deployments are changed from their initial deployments due to the lifecycle operations. For example, as part of a scheduled lifecycle operation, a deployment could be initiated via the portability instructions to move, copy, or retire a given application (or its associated components/artifacts) as part of the lifecycle operation. Additionally or alternatively, the lifecycle operation can be triggered in response to detecting an event (e.g., via feedback).

Additional logic can be provided in the deployment manager 120 to process an event received from the monitor 180 (e.g., infrastructure monitoring). Such monitoring logic can thus detect the occurrence of events and trigger adjustments in resource parameters for a corresponding deployment. As a result and for scaling up, the cloud deployment for the given application 110 can be moved to less loaded environment, for example. New instances of the application 110 can be deployed in a different deployment within the cloud environment. For scaling down, old instances of the application can be un-deployed/retired, such as may identified via the RTSM described above and redeployed based on modified application models 140 and policies 150. Policies 150 and/or application models 140 can also request changing or reconfiguring traffic instances and when scaling changes. Workload portability can include moving the complete set of applications to new clouds if needed (e.g., desired/requested by administrator or as a result of monitoring).

Application portability can be provided across infrastructure, clouds or pools that may all be heterogeneous. This can include implementations based on one or multiple hardware (HW) and/or software (SW) configurations. Modules in the system 100 can also be identified on one or multiple HW/SW configurations. Support can also be provided for Software as a Service (SaaS) and virtualized versions of above on HW and/or SW and on the cloud 130.

The cloud 130 can be a hybrid such that it can be a combination of traditional Data Centers that are made to behave like infrastructure resources, private clouds (cloud technology developed on premise), public clouds (offered by service providers and managed cloud configurations (managed on premise or in a public cloud/virtual private cloud). As used herein, the term application applies to a collection of components. For example, the application 110 can be characterized by a set of artifacts (e.g., installer, executable, configurations and so forth, and a set of components that are installed and interact with each other (e.g., code, middleware (MW), databases, operating system (OS), and so forth). Also, as used herein, the term determining can include compiling, enumerating, and matching.

As used herein, the term "substantially" is intended to indicate that while the function or results of the term being modified are a desired or intended result that some variation can result. In this context, for example, the term "substantially match" describes a situation that the resulting analysis and comparison is performed to identify resources that are the same; however, in practice the match can correspond to a set of resources that sufficiently similar to enable deployment. Where more than one such set of resources might correspond to a match, the deployment manager 120 can select a best matching set of available resources. Other approaches for selecting such match can be utilized.

The application model 140 can be employed to characterize a given application 110 for deployment on the cloud network 130, such as though metadata descriptions for various components of the application. The deployment manager 120 can be implemented via instructions executable or data readable by a processor to analyze an application requirement for the given application 110 based on the application model 140 and a policy 150 (or policies) associated with the given application. As will be described below, the policy 150 can be provided to describe additional operating context for the application 110 (e.g., operate application after midnight, use only east coast servers, maintain load balancing between servers, deploy within a given network domain, ensure load is between specified limits on servers, ensure there are no upcoming maintenances within a given window, and so forth as well techniques to "measure closeness" of the matches). The deployment manager 120 can then determine infrastructure resources in the cloud network sufficient to fulfill the application requirement of the application 110 as specified by the model 140 and policy 150.

Infrastructure capabilities of the cloud 130 can be determined via resource offerings and metadata associated with the cloud. For instance, a plurality of service providers supporting the cloud 130 can provide files that specify what types of resources they have available and metadata that describe properties of interest for the respective resource offerings (e.g., resource offering of three servers available with metadata specifying memory size and processor speeds, load (if already instantiated), location, tenancy terms, service level agreements (SLAs), scheduled maintenances, and so forth). In one example, the deployment manager 120 can automatically deploy the given application 110 on the cloud network 130 after the matching of application requirements of the application 110 to the capabilities of the cloud as specified by the resource offerings and metadata. In this type of example, it usually amounts to executing the instructions of other following examples described below (possibly by calling external systems that manage the lifecycle of the infrastructure and/or of the applications).

As noted previously, the term application 110 can include a set of components that are to be installed and executed (e.g., multiple tiered logic, user interface (UI), MW, DB, OS in addition to the code to install and configuration of such components). Thus, the application 110 refers to these sets of components and artifacts which can also include repositories of such components and artifacts. The application can also be identified by pointers to the components and artifacts including individual pointers or pointers to a set of components. In another example, the deployment manager 120 can generate instructions to inform a system (or user) on how to deploy the given application 110 on the cloud network 130. In either example, the deployment manager 120 automatically correlates requirements of the application 110 as specified by the model 140 and policy 150 with capabilities of the cloud 130 as specified by the resource offerings and metadata.

The system 100 utilizes a policy and model-driven approach to automate deployment as opposed to manual procedures of conventional systems. The system 100 can dynamically (or statically) optimize and bind infrastructure resources (characterized by metadata properties) to applications 110 based on models 140 and policies 150 that characterize their requirements in terms of infrastructure properties. This can include matching application metadata to resource metadata as well as taking into account policies and context to automate optimized or preferred/labeled deployment of applications and their components/dependencies on the cloud 130 without also requiring manual deployment steps. In one example, the system 100 allows tracking of instances while also supporting automated management of such instances (e.g., automated monitoring and feedback described below). Different techniques are provided to ingest, author, and design metadata that can also describe infrastructure templates, application models, and policies.

Such instances can be stored in a database or repository (not shown) along with the application 110, application model 140, and policy 150.

The system 100 can employ closed feedback loops (See FIG. 4) for monitoring applications. Such monitoring applications can be based on policy such as to scale up or scale down an application execution requirement, for example, as well as to notify appropriate recipients, such as users or system applications. In one example, listeners can be installed in various components to capture events from monitoring. Events received by listeners can trigger handlers that can generate lifecycle management operations on the system (e.g., scale up, scale down, move, de-provision, alert someone, run another executable that may involve composition of the systems described herein and other applications, and so forth.

The system 100 can be implemented on one or multiple hardware platforms, wherein the modules in the system can be executed on one or across multiple platforms. Such modules can run on cloud technology (various forms/and hybrid clouds) or offered as a SaaS (Software as a service) that can be implemented on or off the cloud. Complex applications can be automatically deployed on required infrastructure without also requiring users to understand how to perform such operations. Policies 150 provide automated instructions for operating guidelines that help administrators mitigate deployment errors. Metadata can also be associated with the application by identifying the type of application (e.g., via UI or API), then the user does not need to understand the application characteristics. This approach allows "best practice", recommended or imposed deployment models for applications based on their association to metadata.

Policies also allow separating the application characteristics from other contextual considerations (e.g., about user, about application, about infrastructure, about context, about that specific user, about that specific application, and so forth. This facilitates the reuse of the application models across numerous applications. Particularization can also be achieved via policies. This is also how for example the system imposes that a specific set of characteristic values are fixed for a given application or version. For example, the system could apply a generic application model for web applications, yet in another case, explicitly specify a different model or certain values for the attributes of the model. Resources can also be provided from hybrid clouds (e.g., some resources provided from local databases and servers and some resources provided from Internet services).

For purposes of simplification of explanation, in the example of FIG. 1, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, computer executable instructions, hardware (e.g., an application specific integrated circuit or a processing unit), or as a combination of both. In other examples, the components could be distributing among remote devices across a network. In one example, topologies can be defined where an applications template can include a topology model of which components should be deployed (e.g., what component to be deployed at which location). In an example, the deployment manager 120 could be provided with a topology model and then determine the best infrastructure resources to match it. In another example, after provisioning of the resources and deployment of the application components, then a topology instance can be created. It can be stored and used for later management, monitoring, and so forth.

Figure 2:
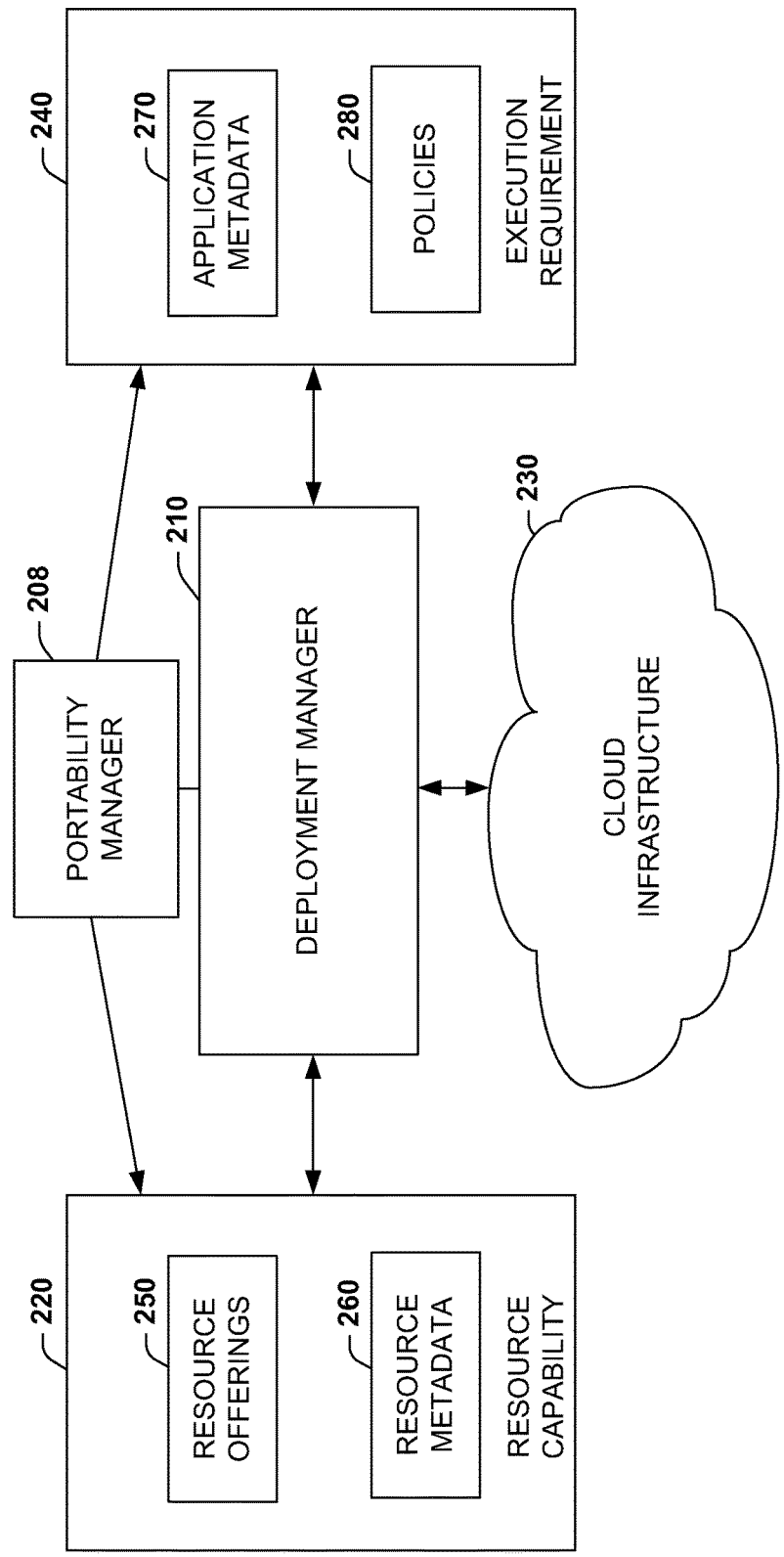
FIG. 2 illustrates an example of a portability manager and deployment manager for correlating a resource capability for a cloud infrastructure application requirement.

FIG. 2 illustrates an example of a portability manager 208 and deployment manager 210 for correlating a resource capability 220 for a cloud infrastructure 230 with an application requirement 240 of an application. The portability manger 208 cooperates with the deployment manager 210 to change deployments on the cloud infrastructure 230 as described above with respect to FIG. 1. The resource capabilities 220 can include resource offerings 250 that can be from a pool of resource offerings provided by a plurality of resource providers that support the cloud 230. Such resource offerings can include one or more of cloud services (e.g., accessible via corresponding application program interfaces (APIs)), existing systems that can activate and provision such services, or existing external compositions (parameterized workflow/composition script with functions calls), for example. The resource offerings 250 can be compiled by/ingested from resource providers.

The resource capability 220 also includes resource metadata 260 associated to each resource offering that characterize properties of interest of the resource. The resource metadata can be generated, for instance, based on the resource offerings, such as at ingest thereof. For example, such metadata 260 can specify location/topologies (e.g., for composite resources), hardware, CPU, memory, operating system included or supported, other software aspects, and labels among other specifications, capacities, SLAs, scheduled maintenances, workload (if already in partial use). The resource metadata 260 can be associated to any resource designed or added to the resource pool by the resource design or ingestion process. Metadata describing the applications models and resource offerings can be captured via designer (e.g., a tool, Portal UI or APIs) to describe the metadata. Metadata including recipes (e.g., corresponding to instructions for deployment and other lifecycle management functions such as un-deployment and monitoring) can constitute resource templates. The resource metadata 260 and the associated resource offerings 250 that is specified by the metadata can be provided as part of a template (e.g., data file of metadata and offerings) that can be utilized by other applications.

The execution requirement 240 of the given application can be specified via application metadata 270 that can be defined at or after application design. This can include components to be individually deployed (e.g., multiple applications in multiple tiers). The application metadata 260 can also specify requirements/preferences on resources. This can include generic deployment scripts as workflow or processes (asynchronous or synchronous). The deployment scripts can further include deployment instructions for each component (e.g., script to run on allocated resource, instruction to services, and so forth). This can include associated instructions to deploy agents or prepare for monitoring and/or management. Instructions can be applied across components. In general, the application metadata 270 can represent the application models described above with respect to FIG. 1. A given application model can be stored in memory and utilized by multiple applications to facilitate deployment thereof. As noted previously, an application can include a plurality of cooperating components and artifacts (e.g., sources or executable and installable) provided with the applications that are utilized by the deployment scripts.

As shown, additional policies 280 can be provided that apply to the application/Infrastructure and refer to context for operating an application. For example, a policy may specify a location for an application (e.g., only operate on east coast servers), a time (e.g., operate after midnight and before 6:00 AM), a processing requirement (e.g., processing speed and memory needs specified), and/or a load balancing requirement (e.g., no server is to operate with over 50% load), SLAs, availability requirements (e.g. no scheduled maintenance within next x days etc), security (e.g., a particular network domain or security domain). As disclosed herein, the policy can be programmable and be modified, such as in response to a request (e.g., a deployment request or request triggered in response to detecting one or more events).

Applications can be deployed by the deployment manager 210 as commanded by the portability manager 208 by retrieving the associated metadata 170 and matching resource offerings 150 available in the pool of resources based on best match (can be exact labeling if for example imposed by policies). Matching of resource metadata 260 to application metadata 270 can be according to strict specifications (e.g., processors must operate at 1 GHZ) or can be matched according to threshold specification (e.g., any processor operating over 500 MHZ is acceptable). Thus, matching can be absolute matching or can be substantial matching where the matching is best fit or close to the desired match criteria. Recipes can be processed by the deployment manager 210 and refer to the code/artifact to use for application deployments. Such recipes can be made available via a known repository location or referred to via a pointer to the recipe, for example. Topologies of composite resources that correspond to an application can be saved as a new resource type by the deployment manager 210 for reuse when similar application metadata is used by another application, for example. Multiple releases of the same applications or similar applications can reuse the same application metadata and application model but, for example, with different policies to relate to operating context.

Figure 3:
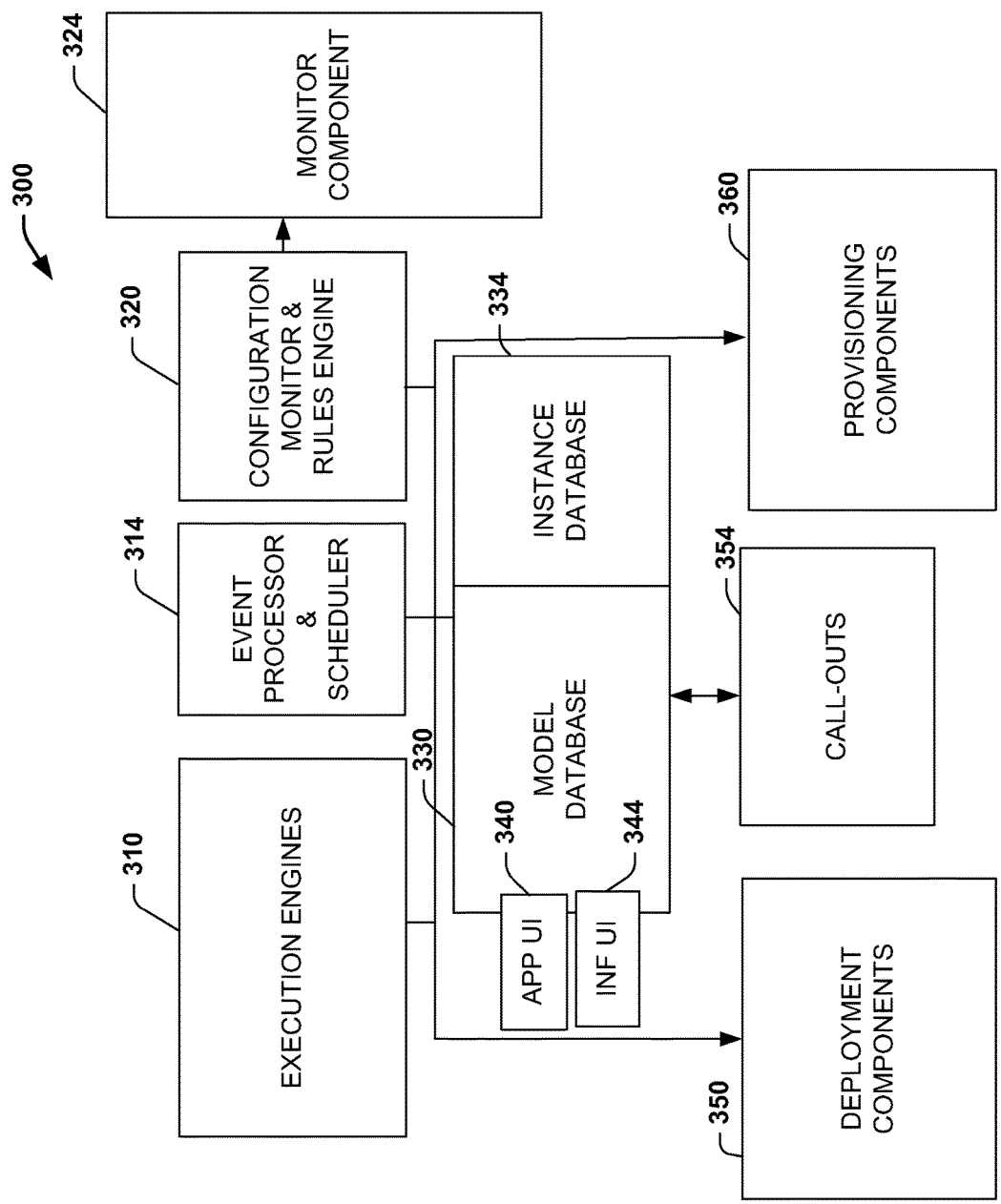
FIG. 3 illustrates an example system for automated portability, deployment, and monitoring of applications.

FIG. 3 illustrates an example system 300 for automated deployment and monitoring of applications. The system 300 includes execution engines 310 for automated deployment of applications. Such engines 310 can also include provisioning managers for establishing service level agreements with service providers and can include the deployment manager and portability manager described above. An event processor and scheduler can 314 can be utilized for processing application events and scheduling tasks associated with the application. As noted previously, listeners/handlers can be defined and installed for monitoring events. This can include scheduling the provisioning/deployment and follow-up lifecycle management operations (e.g. tonight or deploy for next 2 weeks). A configuration monitor 320 and rules engine can be employed for configuring a monitor component 324. The monitor component 324 provides feedback from an application and for applying rules and policies for executing the application.

The system 300 includes a model database 330 that can include application models, infrastructure models, and artifact pointers, for example. An instance database 334 can be employed to store realized target instances of the application. An application user interface 340 can be employed to design the application and configure metadata for operating the application, whereas an infrastructure user interface 344 can be employed to specify infrastructure requirements. Deployment components 350 can include a deployment application programming interface (API) and instructions such as may be specified via a deployment recipe, for example. One or more call-outs 354 can specify customized operating instructions for a given application. Provisioning components 360 can include a provisioning API and plugins for interacting with various cloud infrastructure components.

The system 300 can be utilized as a designer tool to build/deploy infrastructure and application templates. It also allows application developers, testers, or other administrators or designers to build application models. Similarly, they can design policies and rules for execution and deployment. Some or all of the infrastructure and application data can be ingested into the repositories shown as database 330 and 334, respectively. Alternatively, such infrastructure or application data can be passed via APIs. Application artifacts (code, executable, installation packages, and so forth) can be also ingested or referred to via the databases or API's. The APIs or portal user interfaces 340 and 344 can be used to associate or upload requests to match and deploy while also indicating application templates and policies to use, for example. Such APIs and user interfaces can be implemented as part of a designer tool, described previously, to define metadata and associate to infrastructure (e.g., via infrastructure templates and topologies).

Preparation and setup of agent and monitoring tools/can be provided such that applications can discover the instances (which have been instrumented and with agents if needed). This can be achieved via instruction/recipes utilized to deploy infrastructure and application elements after binding the application and its associated components to the infrastructure resources. Events/reports allow closed feedback loops that can be used to scale up/scale out (based on policy) or update context/policies for future changes if allowed by policies as well as notify appropriate parties or systems (See FIG. 4 and description below). As noted above, clouds and resource pools can be hybrid entities where some resources are served locally and some remotely. For clouds or hardware resources that can support auto-scaling, workload management and handling of assurance/monitoring events, the application can be self managed (e.g., utilizes feedback to determine performance, alter application requirements, and generate alerts if necessary).

Figure 4:
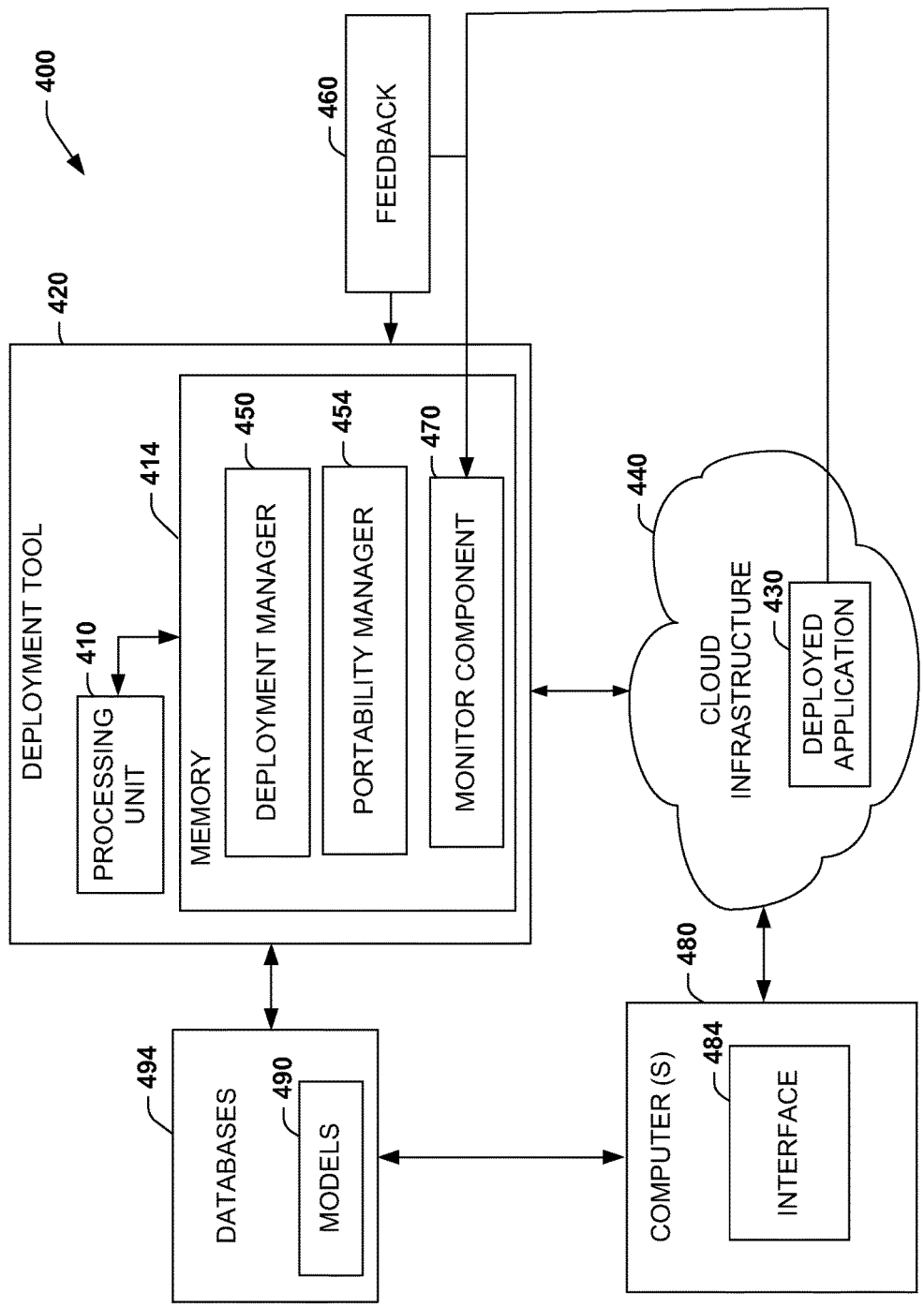
FIG. 4 illustrates an example system utilizing closed loop feedback for portability, deployment, and monitoring of applications.

FIG. 4 illustrates an example system 400 utilizing closed loop feedback to facilitate portability, deployment, and monitoring of applications. The system 400 includes a processing unit 410 (e.g., a processor) that executes instructions from a memory 414. The memory 414 includes any storage media (e.g., volatile or non-volatile) configured for storing computer executable instructions associated with a computer. The processing unit 410 and memory 420 can be provided as part of a deployment tool 420 that deploys an application 430 on a cloud infrastructure 440 via a deployment manager 450 as commanded by a portability manager 454. As shown, feedback 460 is received from the deployed application 430 and processed by a monitor component 470. Such feedback 460 can be status or events from the deployed application 430 which indicate how the application is executing. In one example, the feedback 460 can be employed to adjust operating parameters of the deployed application 430, which have been set according to previously determined application requirements. For instance, a foreground task may be adjusted such that the task operates over a differing number of milliseconds than presently being executed. This can include scaling up or down operating requirements of the deployed application 430. In another example, the feedback 460 may be employed to adjust operating infrastructure of the cloud network 440. For example, service level agreements may be automatically renegotiated with cloud network service providers to increase or decrease available resources to properly meet operating needs of the deployed application 430.

A computer 480 can operate one or more interfaces 484 to program application models 490 and stored in databases 494. The computer can also interact with the deployment tool 420 to alter deployment and facilitate lifecycle management of applications. The interfaces 484 can also configure infrastructure templates, alter operating requirements, configure the monitor component 470, and interact with events and alerts that are generated within the system 400. As noted previously, along with being executed on the cloud, the deployed application 430 can be spread across unrelated clouds or provided as part of a hybrid application. For example, the deployed application 430 could be executed in part on the cloud infrastructure 440 and in part on the databases 494 which are a different entity (e.g., local server databases versus network databases) than the cloud.

Figure 5:
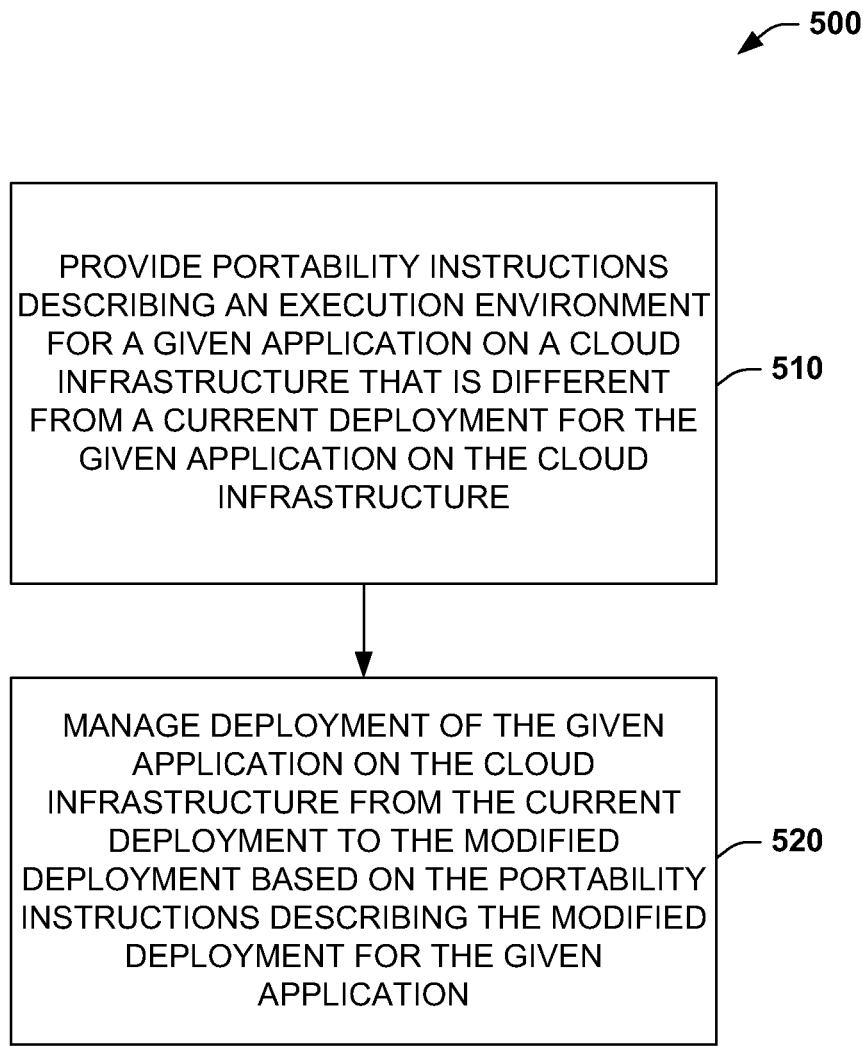
FIG. 5 illustrates a flowchart of an example method for automated portability and deployment of applications.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIG. 5 can be implemented as machine-readable instructions that can be stored in a non-transitory computer readable medium, such as can be computer program product or other form of memory storage. The computer readable instructions corresponding to the method of FIG. 5 can also be accessed from memory and be executed by a processor (e.g., a processing unit of the computer system 410 of FIG. 4).

FIG. 5 illustrates an example method 500 for automated portability and deployment of applications. At 510, the method 500 includes providing portability instructions describing an execution environment for a given application on a cloud infrastructure that is different from a current deployment for the given application on the cloud infrastructure (e.g., via portability manager 160 of FIG. 1). At 520, the method 500 includes managing deployment of the given application on the cloud infrastructure from the current deployment to the modified deployment based on the portability instructions describing the modified deployment for the given application (e.g., deployment manager 120 of FIG. 1). The method 500 can also include monitoring feedback from the given application and altering the deployment or controlling lifecycle management of the given application based on the feedback.

The method 500 can be automatically executed as part of a system such as the example depicted in FIG. 4. The system can include a memory for storing computer executable instructions associated with a computer and a processing unit for accessing the memory and executing the computer executable instructions. Such instructions can include an application model stored in the memory to characterize a given application for deployment on a cloud infrastructure, wherein the application model is instantiated by application metadata. A deployment manager (e.g., via the deployment manager 120 of FIG. 1) stored in the memory can analyze the application metadata for the given application and a policy associated with the given application to determine infrastructure resources in the cloud infrastructure, wherein the infrastructure resources are specified as resource metadata and the deployment manager automatically correlates the application metadata with the resource metadata to fulfill the application requirement. A portability manager can command the deployment manager to modify deployment of the given application on the cloud infrastructure and control lifecycle management of the given application on the cloud infrastructure based on a modification to the policy or the application model. For example, the modifications to policy and/or application model can be utilized by the deployment manager for matching application requirements to cloud infrastructure resources. A monitor component monitors the deployment of the given application and provides feedback associated with the given application to cause the portability manager to adjust the application model or the policy.

Figure 6:
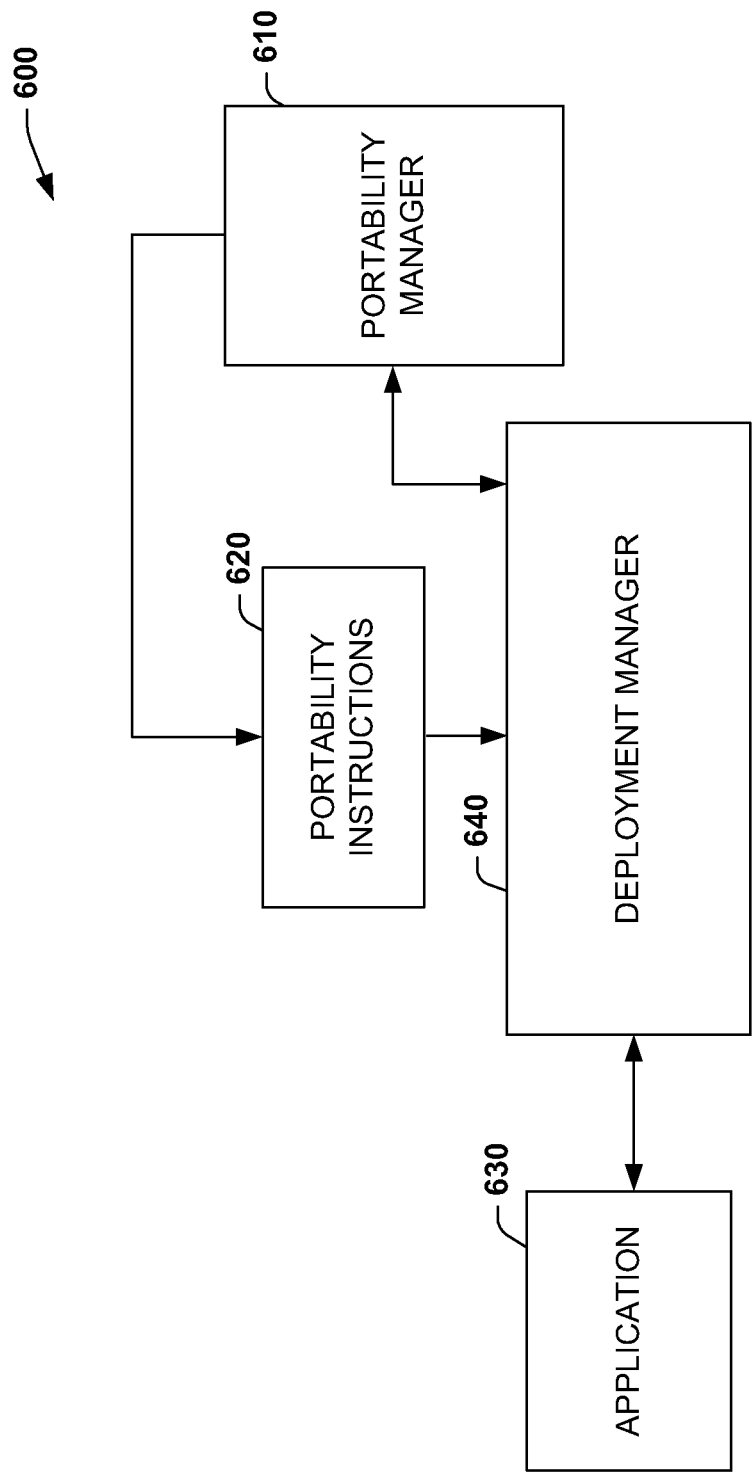
FIG. 6 illustrates an example deployment system for automated portability and deployment of cloud applications.

FIG. 6 illustrates an example deployment system 600 for automated deployment of cloud applications. The system 600 includes a portability manager 610 to provide portability instructions 620 to specify a change in deployment of a given application 630 on a cloud infrastructure. A deployment manager 640 controls deployment or lifecycle management (or both deployment and lifecycle management) of the given application 630 on the cloud infrastructure in response to the portability instructions 620 and based on matching cloud infrastructure resources to application requirements for the given application.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
a portability manager, stored on a non-transitory machine-readable medium a instructions executable by a processor, to provide portability instructions to specify a change in deployment of a given application on a cloud infrastructure, wherein the change in deployment specified by the portability instructions is to move the given application between a private cloud configuration and a public cloud configuration; and
a deployment manager, stored on the non-transitory machine-readable medium as instructions executable by the processor, to control deployment or lifecycle management of the given application on the cloud infrastructure in response to the portability instructions by:
identifying an application requirement of the given application specified through application metadata for the given application;
accessing resource metadata that characterizes infrastructure resources of the cloud infrastructure;
matching the application metadata to the resource metadata to identify at least one specific infrastructure resource to fulfill the application requirement; and
changing the deployment of the given application on the cloud infrastructure based on the matching; and
a monitor component to process event feedback to trigger the portability manager to modify the portability instructions based on the event feedback, the deployment manager to modify, according to the modified portability instructions, the deployment of the given application on the cloud infrastructure by changing an application model and a policy, the application model comprising deployment instructions to deploy a component of the given application, and the policy describing a condition under which the given application is operated.

2. The system of claim 1, wherein the portability manager comprises at least one of an application programming interface (API) or a graphical user interface (GUI) to process a request to cause the portability manager to modify the portability instructions and command the deployment manager to modify, copy, or retire the deployment of the given application.

3. The system of claim 1, wherein the portability instructions specify a new set of cloud resources to be utilized for deployment or management of the given application.

4. The system of claim 1, further comprising at least one database that comprises a service model repository that identifies components of an application to be modified, copied, or retired.

5. The system of claim 4, wherein the service model repository utilizes an API or GUI request to identify the components of the application to be modified, copied, or retired.

6. The system of claim 1, wherein the portability manager is further to deploy a new instance of the given application in a lighter loaded environment based on the event feedback.

7. A system comprising:
a portability manager, stored on a non-transitory machine-readable medium as instructions executable by a processor, to provide portability instructions to specify a change in deployment, from a first deployment to a different second deployment, of a given application on a cloud infrastructure, the change in deployment specified by the portability instructions being responsive to monitoring of the cloud infrastructure during execution of the given application in the cloud infrastructure, wherein the change in deployment specified by the portability instructions is to move the given application between a private cloud configuration and a public cloud configuration; and
a deployment manager, stored on the non-transitory machine-readable medium as instructions executable by the processor, to control deployment or lifecycle management of the given application on the cloud infrastructure in response to the portability instructions by:
identifying an application requirement of the given application specified through application metadata for the given application;
accessing resource metadata that characterizes infrastructure resources of the cloud infrastructure;
matching the application metadata to the resource metadata to identify at least one specific infrastructure resource to fulfill the application requirement; and
changing the deployment of the given application on the cloud infrastructure based on the matching,
wherein the deployment manager is further to alter a service level agreement with a service provider and to adjust the corresponding deployment for the given application accordingly, and
the deployment manager is to modify, according to modified portability instructions responsive to event feedback, the deployment of the given application on the cloud infrastructure by changing an application model and a policy, the application model comprising deployment instructions to deploy a component of the given application, and the policy describing a condition under which the given application is operated.

8. The system of claim 7, further comprising a monitor component to process the event feedback as part of the monitoring, and to trigger the portability manager to modify the portability instructions in response to processing the event feedback.

9. The system of claim 7, wherein the deployment manager and portability manager deploy the given application according to a Software as a Service (SaaS) model or as a virtualized version of hardware or software on the cloud infrastructure.

10. The system of claim 7, wherein the change in deployment specified by the portability instructions is for load balancing in the cloud infrastructure.

11. A method comprising:
managing, by a computer, deployment of a given application on a cloud infrastructure, including:
identifying an application requirement of the given application specified through application metadata for the application;
accessing resource metadata that characterizes infrastructure resources of the cloud infrastructure;
matching the application metadata to the resource metadata to identify at least one specific infrastructure resource to fulfill the application requirement; and
deploying the given application to the cloud infrastructure based on the matching;
monitoring, by the computer, feedback from the given application; and
altering, by the computer, the deployment of the given application based on the feedback, wherein the altering moves the given application between a private cloud configuration and a public cloud configuration, and the altering comprising comprises modifying an application model of the given application and modifying a policy, the application model comprising deployment instructions to deploy components of the given application, and the policy describing a condition under which the given application is operated.

12. A non-transitory computer-readable storage medium storing computer executable instructions that upon execution cause a system to:
monitor a cloud infrastructure during execution of a given application in a first deployment of the cloud infrastructure;
in response to monitoring of the cloud infrastructure, provide portability instructions to modify a deployment of the given application from the first deployment to a different second deployment of the cloud infrastructure, the portability instructions to modify application metadata for the given application and a policy associated with the given application, the application metadata representing an application model utilized by a plurality of applications including the given application, the application model comprising deployment instructions to deploy components of the plurality of applications, the modified application metadata comprising modified deployment instructions of the application model, and the policy describing a condition under which the given application is operated, wherein the modifying of the deployment of the given application from the first deployment to the different second deployment of the cloud infrastructure moves the given application between a private cloud configuration and a public cloud configuration;

analyze, by a deployment manager, the modified application metadata and the modified policy to determine infrastructure resources in the cloud infrastructure, wherein the infrastructure resources are specified as resource metadata and the deployment manager is to analyze the modified application metadata by matching the modified application metadata with the resource metadata to fulfill an application requirement specified in the modified application metadata; and deploy the given application in the second deployment of the cloud infrastructure based on the matching.

13. The non-transitory computer-readable storage medium of claim 12, wherein the monitoring provides feedback associated with the given application to cause the modifying of the application metadata and the policy.

14. The non-transitory computer-readable storage medium of claim 13, wherein the instructions upon execution cause the system to:

alter, by the deployment manager in response to the monitoring, a service level agreement with a service provider; and adjust, by the deployment manager, a corresponding deployment for the given application accordingly.

15. The non-transitory computer-readable storage medium of claim 12, wherein the portability instructions specify a new set of cloud resources to be utilized for the second deployment.

16. The non-transitory computer-readable storage medium of claim 12, wherein the modifying of the deployment specified by the portability instructions is for load balancing in the cloud infrastructure.

* * * * *